United States Patent
Lee

(10) Patent No.: US 11,048,049 B2
(45) Date of Patent: Jun. 29, 2021

(54) FIBER OPTIC CONNECTOR

(71) Applicant: SHEN ZHEN WONDERWIN TECHNOLOGY CO., LTD., Shenzhen (CN)

(72) Inventor: Yen-Chang Lee, Kaohsiung (TW)

(73) Assignee: SHEN ZHEN WONDERWIN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/460,535

(22) Filed: Jul. 2, 2019

(65) Prior Publication Data

US 2020/0012053 A1 Jan. 9, 2020

(30) Foreign Application Priority Data

Jul. 6, 2018 (TW) .................................. 107209157

(51) Int. Cl.
*G02B 6/38* (2006.01)
*G02B 6/00* (2006.01)

(52) U.S. Cl.
CPC ........... *G02B 6/3825* (2013.01); *G02B 6/387* (2013.01); *G02B 6/3821* (2013.01); *G02B 6/3831* (2013.01); *G02B 6/3874* (2013.01); *G02B 6/3893* (2013.01)

(58) Field of Classification Search
CPC ........ G02B 6/38; G02B 6/3825; G02B 6/381; G02B 6/00
USPC .......................................................... 385/53
See application file for complete search history.

(56) References Cited

U.S. PATENT DOCUMENTS

| | | | | | |
|---|---|---|---|---|---|
| 3,874,292 | A | * | 4/1975 | Parsley | B41F 27/14 101/415.1 |
| 4,192,567 | A | * | 3/1980 | Gomolka | H01R 13/33 439/320 |
| 4,977,829 | A | * | 12/1990 | Huggins | B41K 3/06 101/292 |
| 5,044,276 | A | * | 9/1991 | Huggins | B41K 3/06 101/292 |
| 5,149,003 | A | * | 9/1992 | Tharp | A47K 10/38 242/596.3 |
| 5,265,453 | A | * | 11/1993 | Konii | E05B 17/04 70/360 |
| 5,934,822 | A | * | 8/1999 | Green | E01C 23/18 404/94 |
| 6,167,777 | B1 | * | 1/2001 | Snell | B62D 1/184 280/775 |
| 6,698,698 | B1 | * | 3/2004 | Hsieh | F16B 7/105 248/125.8 |

(Continued)

*Primary Examiner* — Kaveh C Kianni
(74) *Attorney, Agent, or Firm* — Brinks Gilson & Lione

(57) ABSTRACT

A fiber optic connector includes a main body and two springs. The main body includes an end wall disposed at a rear end thereof, and two side walls extending from the end wall. Each side wall is formed with a mounting groove and a blocking end disposed at a front end of the mounting groove. The end wall has two positioning holes respectively facing the mounting grooves of the side walls. Each of the springs has a front end abutting against the sleeving unit, a main helical portion, and an extended portion extending from a rear end of the main helical portion into a corresponding one of the positioning holes, so that the springs is positioned between the end wall and the blocking end of a corresponding one of the side walls.

1 Claim, 5 Drawing Sheets

(56) References Cited

U.S. PATENT DOCUMENTS

| | | | | |
|---|---|---|---|---|
| 6,884,099 B1* | 4/2005 | Cannon | ............... | H01R 11/18 |
| | | | | 439/314 |
| 9,933,582 B1* | 4/2018 | Lin | ............... | G02B 6/3821 |
| 2001/0019647 A1* | 9/2001 | Okochi | ............... | G02B 6/4292 |
| | | | | 385/78 |
| 2002/0002393 A1* | 1/2002 | Mitchell | ............ | A61B 18/1477 |
| | | | | 607/101 |
| 2002/0004330 A1* | 1/2002 | Rudoy | ............... | H01R 13/625 |
| | | | | 439/320 |
| 2002/0102130 A1* | 8/2002 | Nygren | ............... | B64G 1/645 |
| | | | | 403/337 |
| 2002/0191919 A1* | 12/2002 | Nolan | ............... | G02B 6/3833 |
| | | | | 385/78 |
| 2003/0101839 A1* | 6/2003 | Duncan | ............... | B62D 1/184 |
| | | | | 74/493 |
| 2003/0121352 A1* | 7/2003 | Bannon | ............... | B62D 1/184 |
| | | | | 74/493 |
| 2003/0122358 A1* | 7/2003 | Bannon | ............... | B62D 1/184 |
| | | | | 280/775 |
| 2005/0046912 A1* | 3/2005 | Nobe | ............... | H04N 1/123 |
| | | | | 358/498 |
| 2011/0143575 A1* | 6/2011 | Meynier | ............. | H01R 13/622 |
| | | | | 439/370 |
| 2013/0142489 A1* | 6/2013 | Isenhour | ............ | G02B 6/3885 |
| | | | | 385/79 |
| 2014/0044395 A1* | 2/2014 | Waldron | ............... | G02B 6/38 |
| | | | | 385/60 |
| 2018/0256366 A1* | 9/2018 | Bai | ............... | A61F 2/583 |
| 2018/0256367 A1* | 9/2018 | Bai | ............... | A61F 2/586 |
| 2018/0263791 A1* | 9/2018 | Bai | ............... | A61F 2/586 |

* cited by examiner

FIBER OPTIC CONNECTOR

CROSS-REFERENCE TO RELATED APPLICATION

This application claims priority of Taiwanese Patent Application No. 107209157, filed on Jul. 6, 2018.

FIELD

The disclosure relates to a connector, and more particularly to a fiber optic connector.

BACKGROUND

Referring to FIG. 1, a conventional fiber optic connector 1 includes a main body unit 11, a connecting end unit 12 connected to a rear end of the main body unit 11, a sleeving unit 13 sleeving to the main body unit 11 and connecting to a front end of the connecting end unit 12, and two springs 14 mounted between the main body unit 11 and the sleeving unit 13 (only one is shown in FIG. 1).

The main body unit 11 includes an end wall 111 disposed at the rear end thereof, two spaced-apart and parallel main walls 113 extending forwardly from the end wall 111, and two spaced-apart side walls 112 respectively interconnecting one of lateral edges of each of the main walls 113. Each of the side walls 112 is formed with a mounting groove 118 extending forwardly from a rear end thereof for a corresponding one of the springs 14 to be mounted thereto, and a blocking end 119 disposed at a front end of the mounting groove 118. Each of the springs 14 is positioned between the end wall 111 and the blocking end 119 of a corresponding one of the side walls 112. The sleeving unit 13 includes a surrounding wall 131, and two positioning blocks 132 (see FIG. 2) that protrude inwardly from the surrounding wall 131 and that cooperate with the blocking ends 119 of the side walls 112 to restrict movement of front ends of the springs 14.

Referring to both FIGS. 1 and 2, when the conventional fiber optic connector 1 is inserted to a specific type of socket (not shown), the sleeving unit 13 is operable to be driven by external force to move rearwardly relative to the main body unit 11 toward the connecting end unit 12. During this time, the springs 14 are compressed by the positioning blocks 132 of the sleeving unit 13 to generate a restoring force that produces a buffer effect between the sleeving unit 13 and the connecting end unit 12. When the fiber optic connector 1 is to be ejected from the socket, the restoring force of the springs 14 reverts the sleeving unit 13 back to its original position. As the springs 14 are usually made of spring steels and are designed to be helical, each of the springs 14 has a center through portion 140. The end wall 111 is formed with two protruded portions 117, each of which is substantially formed as a half-sphere protruding toward a respective one of the blocking ends 119 and extending into the center through portion 140 of a respective one of the springs 14, further reinforcing the positioning of the springs 14 among the blocking ends 119 of the side walls 112 and the end wall 111.

However, since each of the springs 14 is made from one helical spring steel, two ends thereof may exist extended portions 149 that are not helical. As the extended portions 149 are not able to thoroughly surround respective protruded portions 117, rear ends of the springs 14 may shift along the end wall 111 and away from the protruded portions 117, causing the respective springs 14 to tilt. When tilted, the springs 14 lose the capability to provide the restoring force against the sleeving unit 13, thereby detrimentally affecting the ejection process of the fiber optic connector 1.

SUMMARY

Therefore, an object of the disclosure is to provide a fiber optic connector that can alleviate the drawback of the prior art.

According to the disclosure, the fiber optic connector includes a main body unit, a connecting end unit, a sleeving unit, and two springs. The main body unit includes an end wall that is disposed to a rear end thereof, two spaced-apart and parallel main walls that extend forwardly from the end wall, and two spaced-apart side walls that respectively interconnect one of lateral edges of each of the main walls. Each of the side walls is formed with a mounting groove extending forwardly from a rear end thereof, and a blocking end disposed at a front end of the mounting groove. The end wall has two positioning holes that respectively face the mounting grooves of the side walls. The connecting end unit connects to a rear end of the main body unit. The sleeving unit is sleeved to the main body unit and connects to a front end of the connecting end unit. The springs are respectively mounted to the mounting grooves. Each of the springs has a front end that abuts against the sleeving unit, a main helical portion, and an extended portion that extends from a rear end of the main helical portion into a corresponding one of the positioning holes, so that the spring is positioned between the end wall and the blocking end a corresponding one of the side walls.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
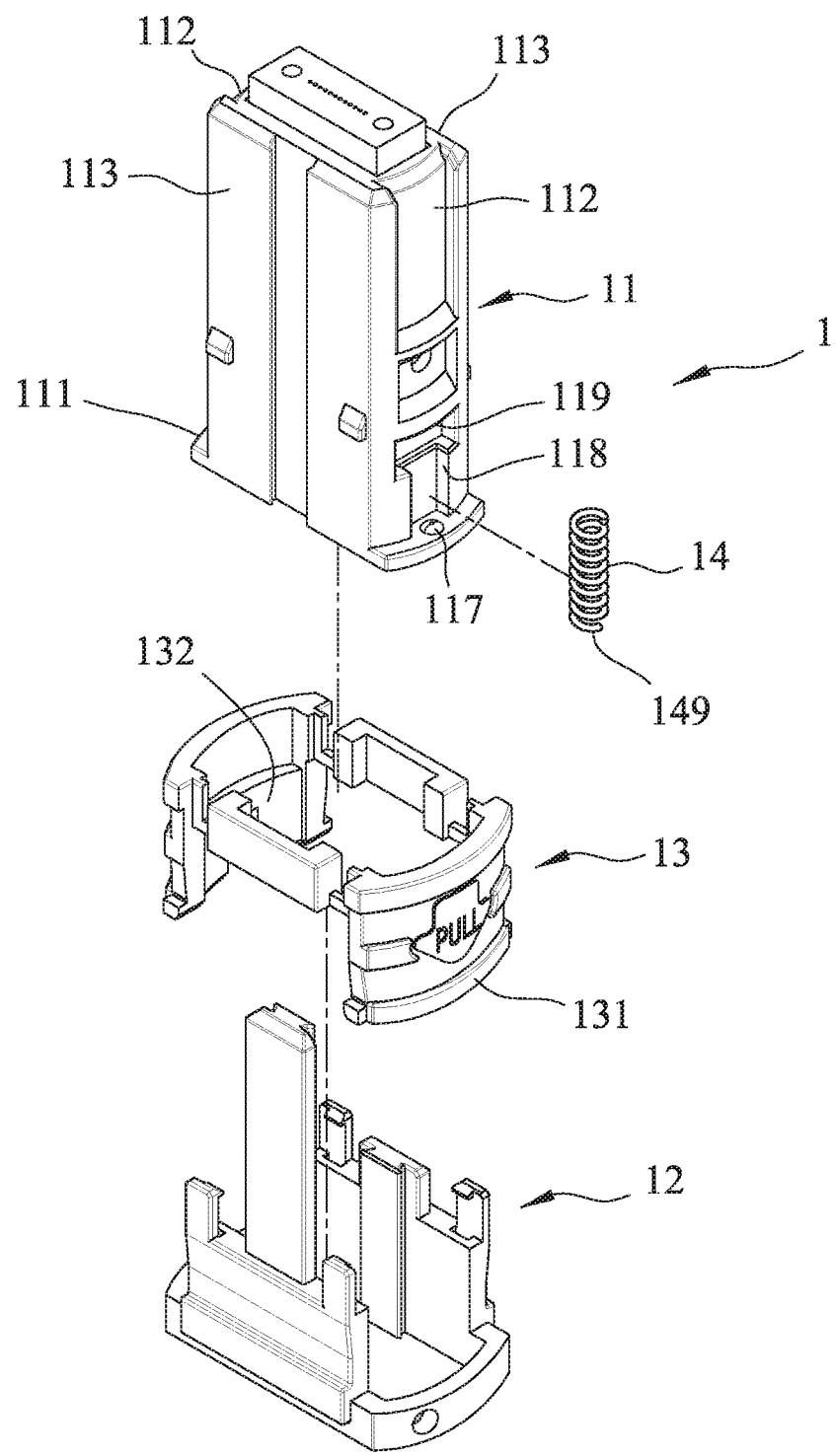
FIG. 1 is an exploded perspective view of a conventional fiber optic connector.
Figure 2:
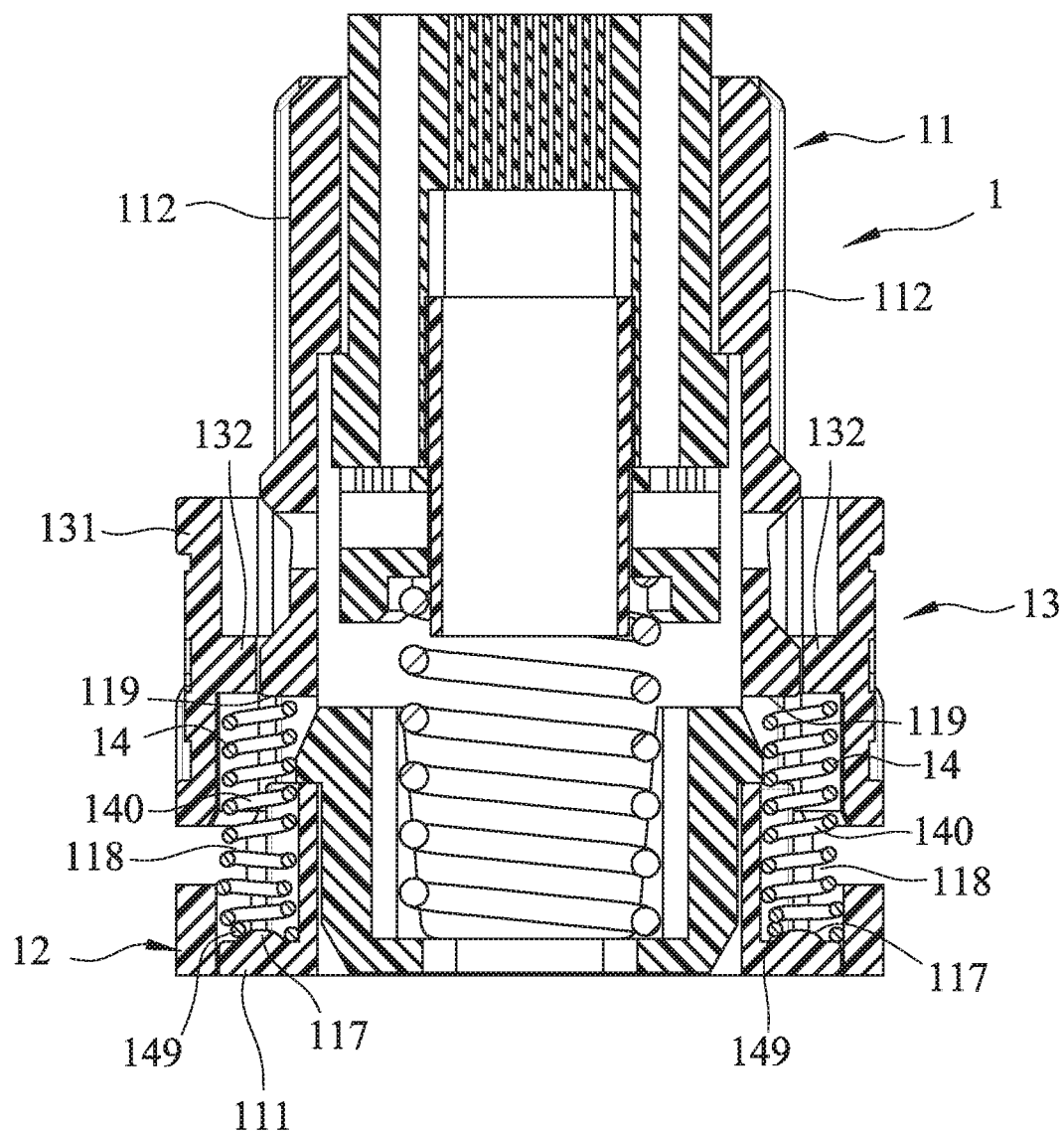
FIG. 2 is a schematic sectional view of the conventional fiber optic connector.
Figure 3:
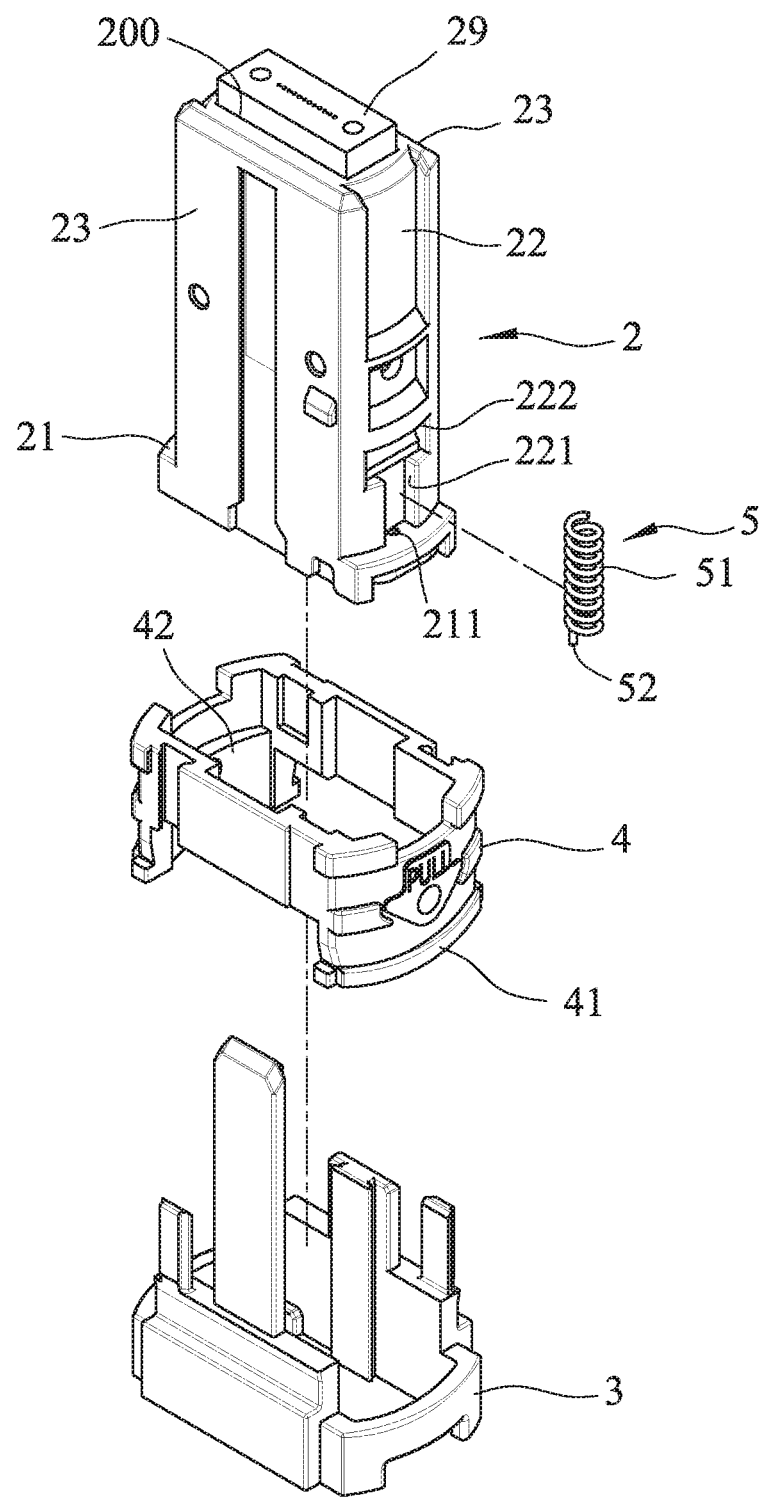
FIG. 3 is an exploded perspective view of an embodiment of a fiber optic connector according to the disclosure.
Figure 4:
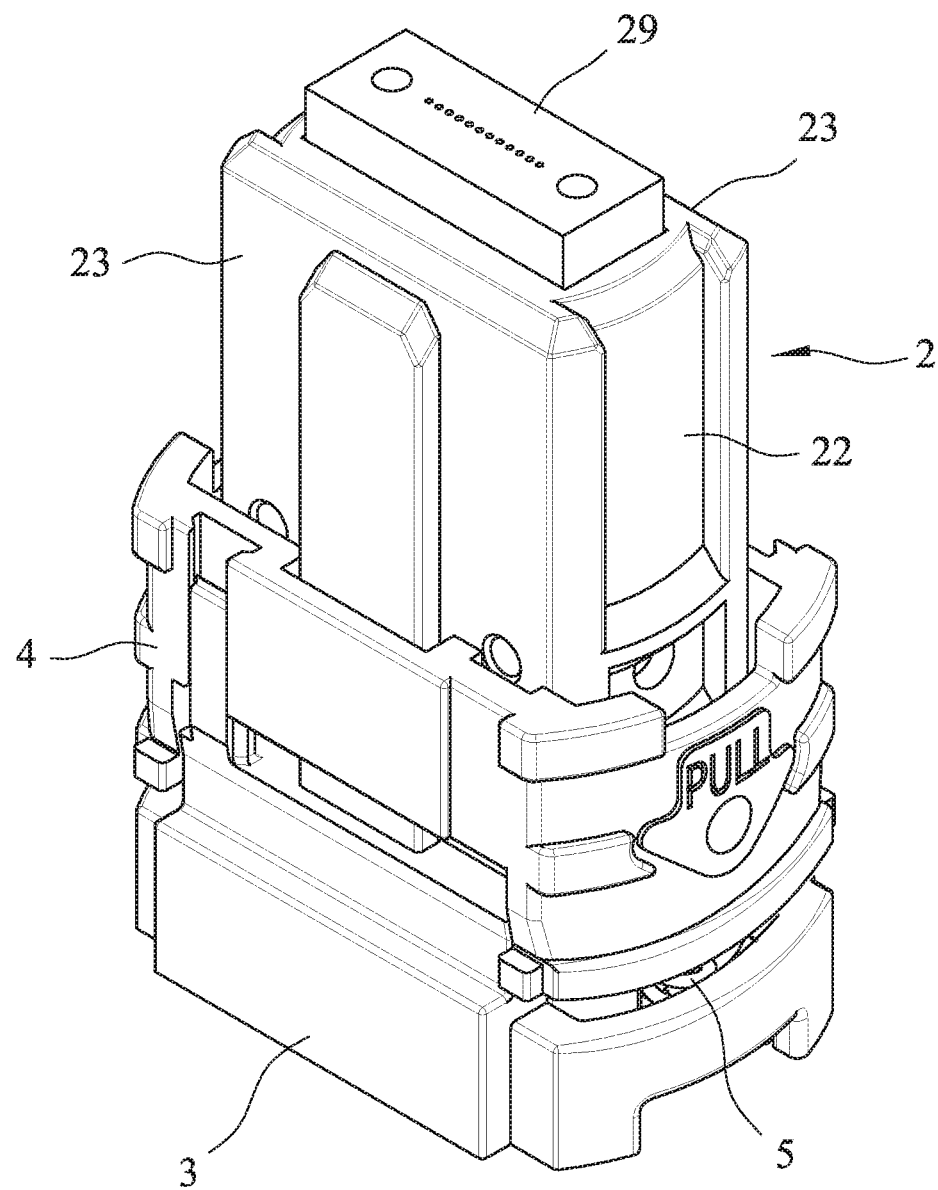
FIG. 4 is an assembled perspective view of the embodiment.

Referring to FIGS. 3 and 4, an embodiment of a fiber optic connector according to the disclosure includes a main body unit 2, a connecting end unit 3 connecting to a rear end of the main body unit 2, a sleeving unit 4 sleeving to the main body unit 2 and connecting to a front end of the connecting end unit 3, and two springs 5 for producing a buffer effect when the embodiment is pulled away from a terminal device (not shown).

The main body unit 2 includes an end wall 21 that is disposed at the rear end thereof, two spaced-apart and parallel main walls 23 that extend forwardly from the end wall 21, two spaced-apart side walls 22 that respectively interconnect one of lateral edges of each of the main walls 23 for cooperatively defining an installation hole 200 therea-mong, and a wiring module 29 that is installed in the installation hole 200 for an optical fiber to be registered therewith. Each of the side walls 22 is formed with a mounting groove 221 extending forwardly from a rear end thereof, and a blocking end 222 disposed at a front end of the mounting groove 221. In other words, a rear end of each of the mounting grooves 221 is blocked directly by the end wall 21. The end wall 21 has two positioning holes 211 that respectively face the mounting grooves 221.

Figure 5:
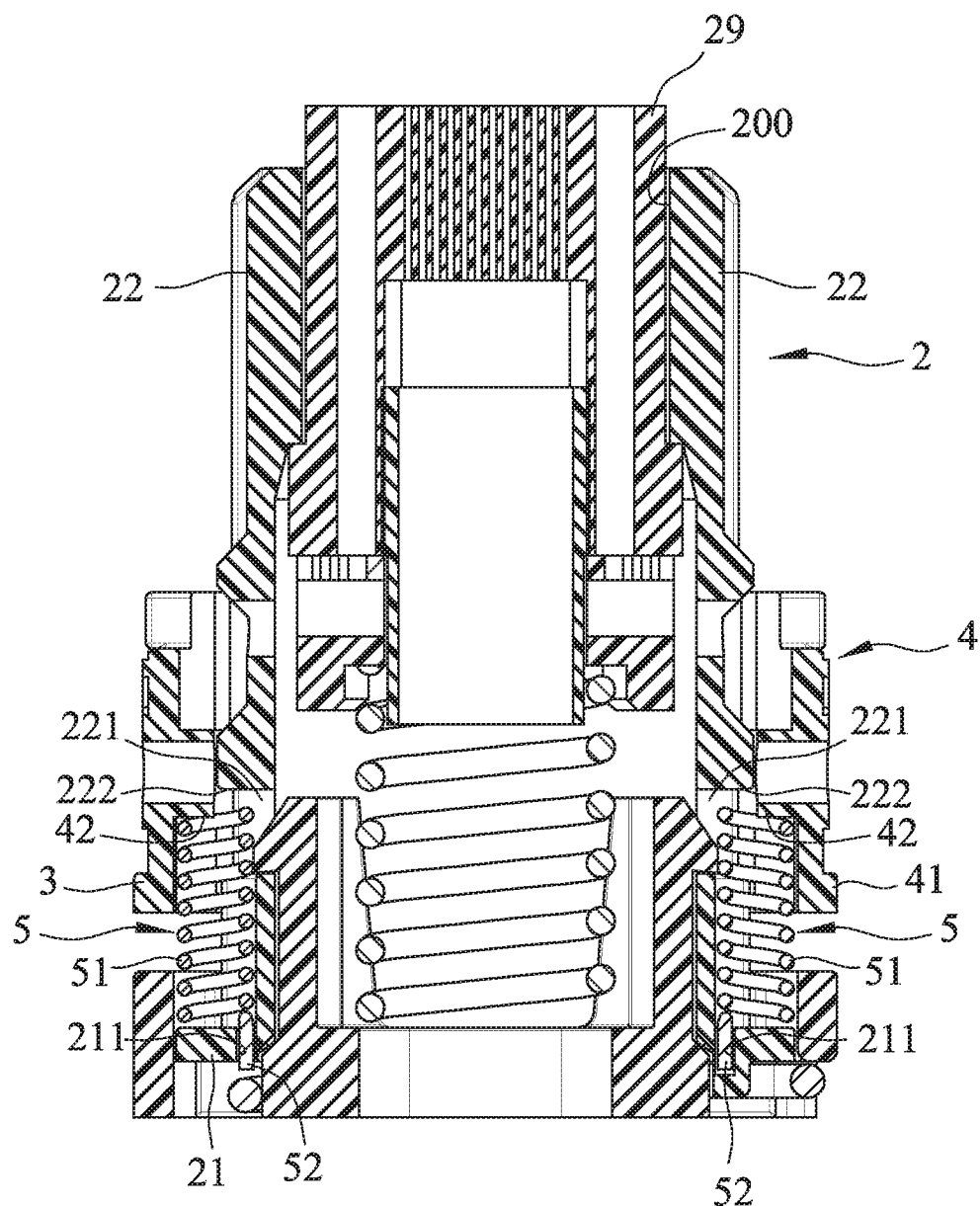
FIG. 5 is a schematic sectional view of the embodiment.

Referring to FIGS. 4 and 5, the sleeving unit 4 is operable to be driven by an external force to move relative to the main body unit 2, and includes a surrounding wall 41, and two positioning blocks 42 that protrude inwardly from the surrounding wall 41 and that cooperate with the blocking ends 222 of the side walls 22 to restrict movement of front ends of the springs 5. With the positioning blocks 42 respectively abutting against the front ends of the springs 5, when the sleeving unit 4 is driven to move relative to the main body unit 2, it also transfers the external force to the front ends of the springs 5 for generating a restoring force.

The springs 5 are respectively mounted to the mounting grooves 221. Each of the springs 5 has a main helical portion 51, and an extended portion 52 that extends from a rear end of the main helical portion 51 into a corresponding one of the positioning holes 211. Each of the springs 5 is positioned between the end wall 21 and the blocking end 222 of a respective one of the side walls 22. As mentioned before, the front ends of the springs 5 abut against respective positioning blocks 42 of the sleeving unit 4. Because the extended portions 52 of the springs 5 may extend into the corresponding positioning holes 211 of the end wall 21 to be fixedly positioned, the rear ends of the springs 5 would not shift along the end wall 21, thereby not tilting the springs 5.

When the embodiment is inserted into a terminal device, the sleeving unit 4 is driven by the external force to move rearwardly, thereby compressing the helical portions 51 of the springs 5 via the positioning blocks 42 to generate the restoring force that produces a buffer effect. When the embodiment is ejected from the terminal device, the restoring force of the springs 5 reverts the sleeving unit 4 back to its original position.

Overall, the extended portions 52 of the springs 5 of the fiber optic connector respectively extend into corresponding positioning holes 211 of the end wall 21 to fixedly position the rear ends of the springs 5 to the end wall 21. Since the springs 5 do not tilt in this setup, the springs 5 would be properly compressed by the sleeving unit 4 to generate the restoring force.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector comprising:
    a main body unit including
        an end wall that is disposed at a rear end thereof,
        two spaced-apart and parallel main walls that extend forwardly from said end wall, and
        two spaced-apart side walls that are respectively connected to lateral edges of each of said main walls, each of said side walls being formed with a mounting groove extending forwardly from a rear end thereof, and a blocking end disposed at a front end of said mounting groove, said end wall having two positioning holes that respectively face said mounting grooves of said side walls;
    a connecting end unit connecting to a rear end of said main body unit;
    a sleeving unit sleeving to said main body unit and connecting to a front end of said connecting end unit;
    two helical springs respectively mounted to said mounting grooves, each of said helical springs having
        a front end that abuts against said sleeving unit,
        a main helical portion, and
        an extended portion that extends from a rear end of said main helical portion into a corresponding one of said positioning holes, so that each of said helical springs is positioned between said end wall and said blocking end of a corresponding one of said side walls;
    wherein said sleeving unit includes a surrounding wall, and two positioning blocks that protrude inwardly from said surrounding wall, and that cooperate with said blocking ends of said side walls to restrict movement of said front ends of said helical springs; and
    wherein said extended portions of said helical springs respectively extend into said positioning holes of said end wall to be fixedly positioned.

* * * * *